United States Patent
Visegrady et al.

(10) Patent No.: US 7,552,164 B1
(45) Date of Patent: Jun. 23, 2009

(54) ACCELERATED PRIME SIEVING USING ARCHITECTURE-OPTIMIZED PARTIAL PRIME PRODUCT TABLE

(75) Inventors: Tamas Visegrady, Zürich (CH); Nicholas Wu, Perth (AU); Joseph Harfouch, Perth (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/108,513

(22) Filed: Apr. 24, 2008

(51) Int. Cl.
   *G06F 7/00* (2006.01)
(52) U.S. Cl. ........................ 708/492; 380/28
(58) Field of Classification Search ............... 708/492; 380/28
   See application file for complete search history.

(56) References Cited

U.S. PATENT DOCUMENTS 7,120,248 B2  10/2006  Hopkins et al.
2002/0174155 A1*  11/2002  Hars et al. .................. 708/491
2005/0027764 A1   2/2005  Agrawal et al.
2007/0112818 A1   5/2007  Sastry
2009/0006512 A1*  1/2009  Ozturk et al. ............... 708/492

FOREIGN PATENT DOCUMENTS

| EP | 00449349 B1 | 4/1994 |
| WO | WO0108350 A1 | 2/2001 |
| WO | WO04001595 A1 | 12/2003 |

* cited by examiner

*Primary Examiner*—Tan V Mai
(74) *Attorney, Agent, or Firm*—MaxValueIP, LLC

(57) ABSTRACT

This embodiment teaches a variation of GCD-based sieving, building tables of prime products, but intentionally restricting the size of table entries to fit within a single machine word. This combination allows one to mix advantages of the two most popular sieves, while retaining the simple and straightforward structure of the simpler one. Divisor length restriction can provide significant savings in the number of long divisions, but may be implemented with only two very specific primitives. The two primitives offer better optimization capabilities than a fully generic multiword arithmetic library.

1 Claim, 1 Drawing Sheet

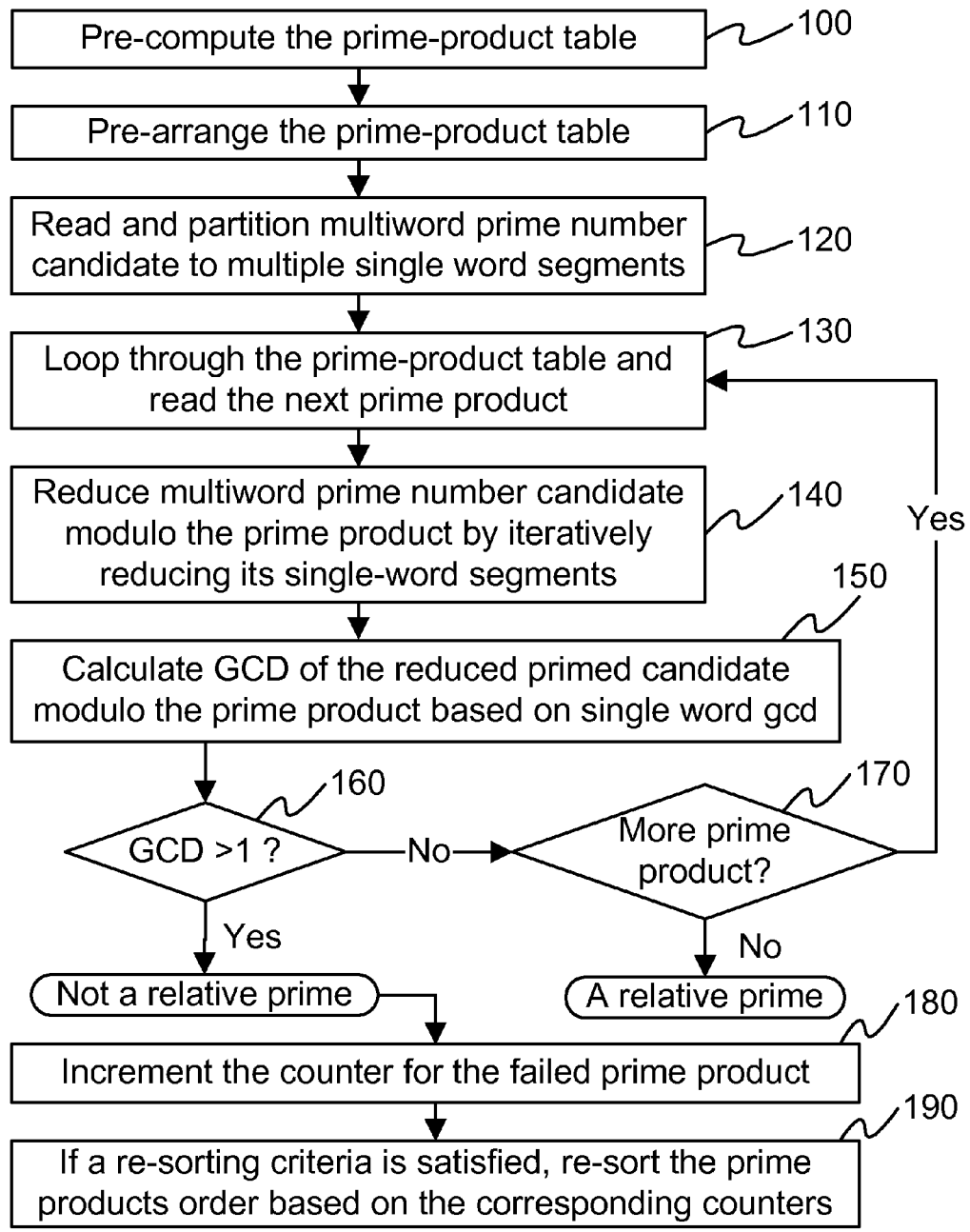

ACCELERATED PRIME SIEVING USING ARCHITECTURE-OPTIMIZED PARTIAL PRIME PRODUCT TABLE

BACKGROUND OF THE INVENTION

Cryptographic operations involving primality testing generally feature preliminary, faster filtering, before subjecting prime candidates to more comprehensive, slower primality checks. As an example, generating RSA keys may involve initial "sieving", typically dividing by the first N (small) prime numbers. If any of these primes divides the candidate, we have proven its composite nature.

A different approach to trial divisions with effectively the same primes is to find greatest common divisors (GCDs) of a table of large products of small primes and the prime candidate. If any of these GCDs produces a result that differs from 1 (i.e. the candidate and a table entry are not relative primes), we have proven the candidate to be composite. Building a table of long prime products (typically, products close to the size of candidates) reduces the number of trial divisions, but it requires a general-purpose library capable of arbitrary multiword arithmetic. Savings are still obtained, as table pre-computation reduces the number of divisions, but each GCD calculation requires multiword division.

We are looking for an efficient trial division of a long prime candidate, trying to find if one of a fixed set of small primes is a divisor (used in cryptographic algorithms, such as in RSA).

SUMMARY OF THE INVENTION

We teach, as an example, a variation of GCD-based sieving, building tables of prime products, but intentionally restricting the size of table entries to fit within a single machine word. This combination allows one to mix advantages of the two most popular sieves, while retaining the simple and straightforward structure of the simpler one. Divisor length restriction can provide significant savings in the number of long divisions, but may be implemented with only two very specific primitives. The two primitives offer better optimization capabilities than a fully generic multiword arithmetic library. (Note that straightforward trial divisions may employ the same optimizations, but we are significantly reducing the number of divisions without adding complexity elsewhere.)

BRIEF DESCRIPTION OF THE DRAWINGS

The FIGURE (FIG. 1 only) is a schematic diagram of the bin packing optimization.

DETAILED DESCRIPTION OF THE PREFERRED EMBODIMENTS

The following summarizes one embodiment of our method:

1. We exploit pre-computed products of small primes to perform multiple trial divisions in parallel while attempting to find a small prime that divides our prime candidate. We reject a candidate if its GCD with any table entry is not 1 (i.e. candidate and table entry are not relative prime).

2. We intentionally restrict the size of divisor prime products to ensure that each product is limited to a single machine word.

3. We require only two basic operations in very specific configurations, multi-word-by-single-word modular reduction (long division without storing the quotient), and single-word-by-single-word GCD calculation. We do not require more generic versions of these operations, allowing very specific optimizations.

4. During pre-computation, we optimize the pre-computed prime-products' table to minimize the number of table entries. While the primes forming table entries are fixed, one has considerable flexibility selecting a grouping of primes (see below).

For runtime optimization, we may rely on performance gains obtained for optimized long divisions based on single-word-arithmetic optimizations (unlike GCD-based sieving, which requires extensions to generic multiple-word arithmetic).

We rely on offline optimization during table construction. Given a fixed set of primes, we must partition them into groups, with the product of primes in a group fitting in a machine word. We search for a partition which minimizes the number of groups needed, as we need to perform one long modular reduction for each table entry. The optimization problem is a variant of the bin packing problem, where "bins" correspond to single-word table entries. We use a definition of "bin fill ratio", as we optimize for the size of products in each "bin". Bin-packing is usually driven by the sum of entries in each bin; we need to use the logarithm of prime-products (table entries) as size to be able to use bin-packing heuristics.

Since we need to pre-compute the prime-products' table offline, once for a given prime count and fixed architecture (word size), we can amortize optimization costs over many sieves. Also, we can use efficient (offline) algorithms to optimize the table, and are not restricted to runtime optimization (mainly online algorithms).

When combining the above features, one may exploit the advantages of both straightforward trial divisions and GCD-based sieving:

1. The only primitives used are very specific, and may be optimized for the particular ways they are used. Since both primitives operate on single-word divisors, they may be implemented without requiring a full multi-word-arithmetic library.

2. The only additional primitive over a long division is single-word-by-single-word GCD, which may be efficiently implemented. Single-word GCD has an effectively constant upper bound on runtime. Worst-case runtime is parameterized by machine word size, and a small constant factor, so we may treat it as a constant for a given architecture.

3. The number of multi-word-by-single-word reductions (effectively, trial divisions) is significantly less than when dividing with the same primes individually, since each reduction tests division by several small primes at the same time.

We compare our method to trial divisions individually, using tables of the first M (small) primes. This division requires only one specific primitive, which advantage we are carrying over to our method. While this constrained setup offers optimization capabilities, the number of trial divisions is significant, equal to the number of prime candidates (typically, in the order of low thousands).

When filtering by calculating GCDs of the prime candidate and pre-computed products of small primes, prime-products are pre-computed to some fixed size, reducing the number of long divisions. However, as products are generated to approach the size of prime candidates, one requires longer modular reductions than when doing short trial divisions. This in turn increases the complexity of the required long number arithmetic, while decreasing overall complexity (as pre-computation during building of the GCD table moves some of total complexity to compilation time). Pre-computed prime products are usually large, since this facilitates optimizations during GCD calculation.

We teach an intermediate optimization, here, which significantly decreases the number of trial divisions, while still allowing one to optimize for a single, very specific case, dividing a multiword number with single-word trial divisors. One must note that most efficient long division implementations are word-granular, with execution time depending on the number of words in a number, essentially independent of the number of bits used within dividend and divisor. We assume that reducing the count of divisors translates to reduction in overall runtime. Our method does not increase the word size of divisors, since we restrict prime-product-table entries to single words.

As part of pre-computation, we optimize the table to minimize the number of entries. A similar problem, bin-packing, is used before, where one attempts to fill the minimum number of fixed-capacity bins with items of varying size. If we redefine how primes "fill" a table entry, we may reuse any existing bin-packing heuristics (the problem itself is NP-hard). In one embodiment of this invention, once an initial assignment of the prime products is pre-computed in the GCD table, the list of prime products is sorted to have prime products with more frequently encountered primes move up in the list in order to reduce the average total time of the trial divisions in GCD operations. One embodiment on invention sorts the prime products in the GCD table based on the smallest prime component (in the prime product) to move up such prime products in the GCD table. Incremental improvements using other heuristics can be used to further optimize the GCD table. One embodiment of the invention keeps track of the count for each prime product for which the GCD operation produced a GCD other than 1 (i.e. finding the candidate prime was not a relative prime to that table entry), e.g., during multiple runs of sieving. The prime products with the larger count (i.e., producing more frequent non-one GCD result) are moved higher in the GCD table.

Cost Estimations

We compare this embodiment with straightforward trial divisions, as we assume the same code would be used to implement both. We ignore the fixed cost of short GCD calculations, as these do not scale with candidate size, while long modular reductions do.

Our embodiment "packs" single-word products, formed from the first M primes, into a pre-computed table. Product of all table entries is equal to the product of the first M primes, so checking GCD with all entries is equivalent to trial divisions with the first M primes.

Table 1 summarizes optimized product-table sizes for typical M and word sizes combinations. Offline costs (table pre-computation) are not represented in the table, as tables are generated once for each (M, word size) pair.

TABLE 1

Table sizes for typical prime counts and word sizes

| Number of Primes | Word size (bits) | Table entries | Savings (%) |
|---|---|---|---|
| 500 | 32 | 160 | 72.0 |
| 1000 | 32 | 401 | 59.9 |
| 2000 | 32 | 901 | 54.9 |
| 3000 | 32 | 1401 | 53.3 |
| 5000 | 32 | 2401 | 51.9 |
| 10000 | 32 | 4901 | 51.0 |
| 500 | 64 | 81 | 83.8 |
| 1000 | 64 | 181 | 81.9 |
| 2000 | 64 | 387 | 80.6 |
| 3000 | 64 | 647 | 78.4 |
| 5000 | 64 | 1147 | 77.6 |
| 10000 | 64 | 2398 | 76.0 |

Prime-Product Table Simple Example

As a way of example (and not limitation), Listing 1 shows a constructed prime-product table assuming M=32 and 16-bit words. The table contains products selected from all primes between 3 and 137, inclusive (we ignore 2 as even candidates would not be practically considered). One may easily generate a 12-entry table that contains the first 32 primes:

Listing 1

| 63437 = | 73 | × | 79 | × | 11 |
| 61841 = | 67 | × | 71 | × | 13 |
| 61585 = | 5 | × | 109 | × | 113 |
| 61183 = | 17 | × | 59 | × | 61 |
| 53841 = | 3 | × | 131 | × | 137 |
| 51709 = | 7 | × | 83 | × | 89 |
| 47329 = | 19 | × | 47 | × | 53 |
| 40549 = | 23 | × | 41 | × | 43 |
| 11021 = | 103 | × | 107 | | |
| 9797 = | 97 | × | 101 | | |
| 4699 = | 37 | × | 127 | | |
| 899 = | 29 | × | 31 | | |

Note that in practical settings, with longer words and larger M, tables may be encoded more efficiently. A typical M (hundreds or low thousands) would increase prime-grouping possibilities, while a larger word size would allow better optimization due to more small primes' products fitting within a single word.

For comparison, for M=10000 and 64-bit words, table entries are the products of 4.17 small primes on the average.

Modular Reduction

We utilize a word-oriented, recursively defined process to find a remainder A mod N of multi-word A and a single-word N. We exploit invariants to minimize the calculations performed during each single-word update. We assume that A is processed from most significant word to least significant, processing words a0 to $a_{k-1}$. We denote ($A_0 \ldots A_{k-1}$) partial multi-words of A in the following way shown in Listing 2. R denotes the maximum word value (e.g., 232 or 264 for 32-bit or 64-bit words, respectively).

Listing 2

$A_0 = a_0$
$A_1 = A_0 \cdot R + a_1$
...
$A_{k-1} = A_{k-2} \cdot R + a_{k-1} = A$ The following recursive definitions in Listing 3 describe the same steps:

Listing 3

$A_n = A_{n-1} \cdot R + a_n$
$A_n \mod N = ([(A_{n-1} \mod N) \cdot (R \mod N)] \mod N + a_n \mod N) \mod N$ One may efficiently calculate ($A_n$ mod N), recognizing that its terms are readily available from the reduction of the previous word, fixed when dividing by the same N, or simply calculated:

1. $A_{n-1}$ mod N is the modulus as output from the partial remainder from the previous word
2. R mod N is fixed, most efficiently calculated outside the loop and reused
3. Sum of two remainders mod N may be reduced mod N with at most one single-word subtraction, as shown in Listing 4:

| Listing 4 | | |
|---|---|---|
| r | = | $[(A_{n-1}$ mod N) · (R mod N)] mod N < N |
| $a_n$ mod N | < | N |
| r + $a_n$ mod N | < | 2N |
| r' | = | r + $a_n$ mod N |
| (r + $a_n$ mod N) mod N | = | r'    if r' < N, or |
| | | r' – N    if r' ≧ N |

We have implemented the k word long reduction into a sequence containing k single-word modular multiplications (single-word modulus), k single-word additions, and up to k single-word subtractions (there may be up to k single-word additions implied, which is not indicated above). The loop may also be efficiently optimized, manually or by compilers, due to its simple regular structure.

Greatest Common Divisor

Following a long modular reduction, we only need to calculate the GCD of two single-word numbers to find gcd(A,N) for multi-word A and single-word N:

$$gcd(A,N) = gcd(A \bmod N, N)$$

where A mod N<N is obtained from the preceding long division. Single-word GCD may be calculated using elementary binary operations. Since we need to find GCDs of short, fixed-sized pairs of single-word numbers, other optimizations (such as lookup tables) may also be used. As the dominant cost would be long modular reductions, GCD should not be optimized unless necessary.

Long Reduction, Generic Pseudo-Code

The following loop, when processing A from most significant word a[0] to least significant word a[k–1], calculates A mod N. We assume word addition to truncate the result to w bits, and that the maximum N fits within a single word (i.e., N<R).

| Listing 5 |
|---|
| ```
rem := 0              // remainder
rmn := R % N          // R mod N
rmin := (R–N) – N     // (R–N) mod N
for i := 0 to k–1
    tmp := (rem * rmn) % N    // single-word modular multiply
    rem : tmp + a[k] % N       // w-bit addition, ignoring overflow
    if rem < tmp:              // overflow, tmp == rem – R
        rem = rem – rmin       // add back R (mod N)
    if N <= rem:
        rem = rem – N
endfor
``` |

If the divisor N is sufficiently small (specifically, 2N<R), one can remove one additional check from the loop, as the intermediate addition in rem may never overflow (produce a value over R) as it is the sum of two values mod N:

| Listing 6 |
|---|
| ```
rem := 0              // remainder
rmn := R % N          // R mod N
rmin := (R–N) – N     // (R–N) mod N
for i := 0 to k–1
    tmp := (rem * rmn) % N    // single-word modular multiply
    rem := tmp + a[k] % N      // w-bit addition, never overflows
    if N <= rem:
        rem = rem – N
endfor
``` |

Since a conditional assignment is removed from the loop, one may observe a performance improvement on architectures where branching is expensive (such as modern RISC processors). In such a case, one may include both versions of the loop, and select one depending on N.

An embodiment of the invention is a method for accelerating prime sieving of a multiword prime candidate in a computing device, the method is comprised of:

Pre-computing a prime-product table (100) by performing a bin packing optimization to create a plurality of prime products in the prime-product table from a fixed set of distinct prime numbers. An objective function of the bin packing optimization is to minimize a number of prime products of the plurality of prime products such that a sum of logarithm of constituent prime numbers used in each prime product in the plurality of prime products is less than logarithm of a single machine word of the computing device, in order to keep each prime product less than the single machine word.

Pre-arranging (110) the plurality of prime products to a plurality of ordered prime products in the prime-product table by sorting the plurality of prime products based on a smallest prime number among the constituent prime numbers used in the each prime product. Reading the multiword prime candidate from a first memory location in the computing device. Partitioning (120) the multiword prime candidate to a plurality of single-word candidate segments.

For each ordered prime product in the prime-product table (130), calculating a reduced prime candidate as modular reduction of the multiword prime candidate modulo the each ordered prime product (140), and storing the reduced prime candidate in a second memory location in the computing device.

The calculating reduced prime candidate step comprises of: Calculating a reduced machine word as modular reduction of the single machine word modulo the each ordered prime product. For each single-word candidate segment of the plurality of single-word candidate segments, calculating a reduced segment part as single-word modular reduction of the each single-word candidate segment modulo the each ordered prime product, determining a new remainder based on addition of the reduced segment part and single-word modular reduction of single-word multiplication of an old remainder and the reduced machine word modulo the each ordered prime product.

Adjusting the new remainder based on the each ordered prime product, calculating a greatest common divisor of the reduced prime candidate and the each ordered prime product using a single-word greatest common divisor method (150), and storing the greatest common divisor in a third memory location in the computing device, until the greatest common divisor is greater than one, or the calculating the reduced prime candidate step and the calculating the greatest common divisor step are performed on all ordered prime products in the prime-product table (170).

If the greatest common divisor is greater than one (160), then incrementing (180) a counter associated with the each ordered prime product in the prime-product table and re-sorting (190) the plurality of ordered prime products to a plurality of re-sorted prime products in the prime-product table based on the counter.

A system, apparatus, or device comprising one of the following items is an example of the invention: prime numbers, tables, security, encryption, keys, computers, security module, input device, computer monitor, or any display device, applying the method mentioned above, for purpose of security and key management.

Any variations of the above teaching are also intended to be covered by this patent application.

The invention claimed is:

1. A method for accelerating prime sieving of a multiword prime candidate in a computing device, the method comprising:

pre-computing a prime-product table by performing a bin packing optimization to create a plurality of prime products in the prime-product table from a fixed set of distinct prime numbers;

wherein an objective function of the bin packing optimization is to minimize a number of prime products of the plurality of prime products such that a sum of logarithm of constituent prime numbers used in each prime product in the plurality of prime products is less than logarithm of a single machine word of the computing device, in order to keep the each prime product less than the single machine word;

pre-arranging the plurality of prime products to a plurality of ordered prime products in the prime-product table by sorting the plurality of prime products based on a smallest prime number among the constituent prime numbers used in the each prime product;

reading the multiword prime candidate from a first memory location in the computing device;

partitioning the multiword prime candidate to a plurality of single-word candidate segments;

for each ordered prime product in the prime-product table, calculating a reduced prime candidate as modular reduction of the multiword prime candidate modulo the each ordered prime product, and storing the reduced prime candidate in a second memory location in the computing device, wherein the calculating the reduced prime candidate step comprises:

calculating a reduced machine word as modular reduction of the single machine word modulo the each ordered prime product, for each single-word candidate segment of the plurality of single-word candidate segments, calculating a reduced segment part as single-word modular reduction of the each single-word candidate segment modulo the each ordered prime product, determining a new remainder based on addition of the reduced segment part and single-word modular reduction of single-word multiplication of an old remainder and the reduced machine word modulo the each ordered prime product, and adjusting the new remainder based on the each ordered prime product, calculating a greatest common divisor of the reduced prime candidate and the each ordered prime product using a single-word greatest common divisor method, and storing the greatest common divisor in a third memory location in the computing device, until the greatest common divisor is greater than one, or the calculating the reduced prime candidate step and the calculating the greatest common divisor step are performed on all ordered prime products in the prime-product table;

if the greatest common divisor is greater than one, then incrementing a counter associated with the each ordered prime product in the prime-product table;

re-sorting the plurality of ordered prime products to a plurality of re-sorted prime products in the prime-product table based on the counter; and generating RSA keys for security or key management in a cryptographic operator in said computing device, by a RISC processor in a security module in a computer.

* * * * *